Figure 1:
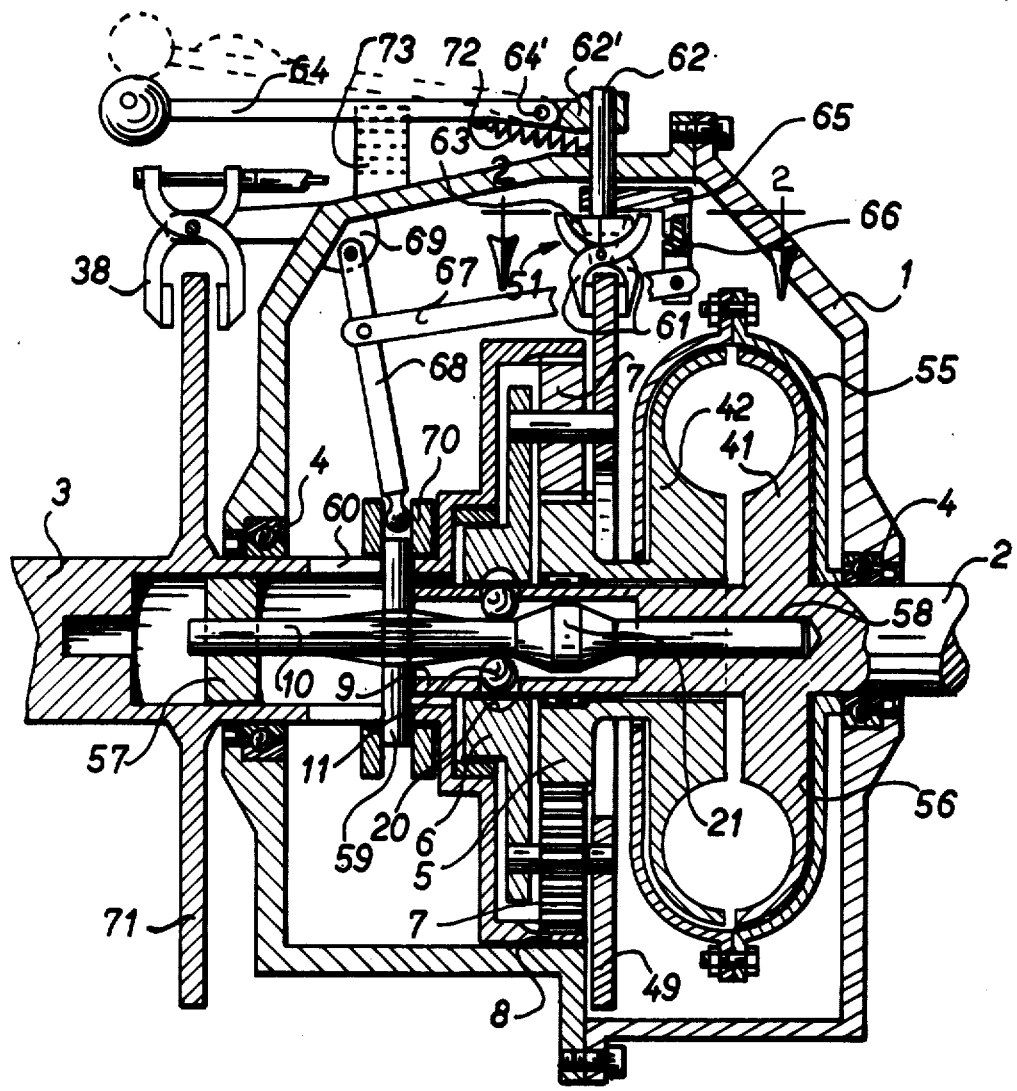

United States Patent [19]
Gingras

[11] 3,893,350
[45] July 8, 1975

[54] VARIABLE RATIO TRANSMISSION WITH REVERSE DRIVE

[76] Inventor: Claude A. Gingras, Dosquet, Canada

[22] Filed: June 3, 1974

[21] Appl. No.: 476,060

[52] U.S. Cl. .................. 74/688; 74/372; 74/732; 74/792
[51] Int. Cl. ............................................. F16h 47/08
[58] Field of Search ............. 74/372, 792, 688, 732; 192/96

[56] References Cited
UNITED STATES PATENTS

| | | | |
|---|---|---|---|
| 1,204,379 | 11/1916 | Tuttle | 74/792 |
| 1,234,802 | 7/1917 | Radcliffe | 74/792 X |
| 1,704,433 | 3/1929 | Harris | 74/372 X |
| 1,814,442 | 7/1931 | Gilbert | 74/792 |
| 3,543,607 | 12/1970 | Schmidt et al. | 74/688 |

*Primary Examiner*—Benjamin W. Wyche
*Assistant Examiner*—John Reep

[57] ABSTRACT

Transmission adapted to effect a variable ratio forward and reverse drive for snowmobiles, all terrain vehicles, passenger vehicles, trucks and the like. The transmission includes a single planetary gear set with the output shaft directly secured to the ring gear and the sun gear adapted to be coupled to the input shaft by means of a fluid coupling. An axially displaceable control member selectively locks or unlocks the planet carrier to the input shaft. A brake system serves to stop rotation of the planet carrier when unloaded. A control linkage simultaneously applies the brake to the planet carrier and moves the control member to unlocking position. For reverse drive, the planet carrier is braked and unlocked from the input shaft and gradual fluid coupling between the input shaft and the sun gear causes gradual acceleration of the output shaft in reverse direction, because the planet gears rotate the ring gear in reverse. For forward drive, the brake system is released and the planet carrier locked to the input shaft. The sun gear is gradually locked to the input shaft by means of the fluid drive, resulting in the progressive obtention of a one-to-one ratio between the input and output shafts.

2 Claims, 2 Drawing Figures

VARIABLE RATIO TRANSMISSION WITH REVERSE DRIVE

The present invention relates to a variable ratio transmission with reverse drive and, more particularly, to such a transmission adapted for small size construction and relatively inexpensive applications to constitute a transmission for a snowmobile, all terrain vehicle and the like.

It is a more specific object of the invention to provide a transmission with reverse drive including a single planetary gear set and a simple control member to select forward and reverse drive.

Another object of the invention is to provide a transmission of the character described, wherein in forward drive there is a gradual coupling of the sun gear to the input shaft while the planet carrier is locked to the input shaft, resulting in two elements of the planetary gear set being finally interlocked, thereby resulting in a direct transmission with no relative movement of the gears of the planetary gear set.

Figure 2:
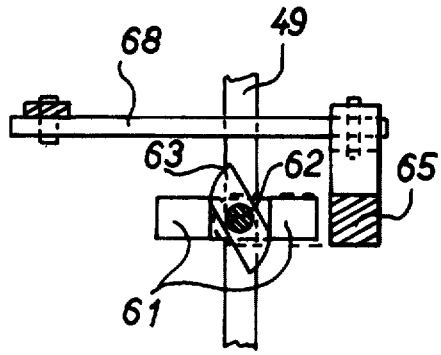

The foregoing and other objects of the invention will become more apparent during the following disclosure and by referring to the drawings, in which:

FIG. 1 is a longitudinal section of a preferred embodiment of the invention; and FIG. 2 is a cross-sectional view taken along line 2—2 of FIG. 1.

In the drawings, like reference characters indicate like elements throughout.

The transmission of the invention includes a casing 1, of any appropriate construction to form a liquid-tight enclosure to contain oil into which the moving parts are at least partially immersed. An input shaft portion 2 and an output shaft portion 3 are mounted by bearings 4 in end-to-end aligned relationship through opposite end portions of the casing 1.

A planetary gear set is arranged inside casing 1 in co-axial and co-operative association with the input and output shaft portions 2 and 3. The planetary gear set includes a sun gear 5, a planet carrier 6, planet gears 7 and a ring gear 8. The latter is secured to the output shaft portion 3.

The input shaft portion 2 includes a hollow input shaft portion 9 around which are rotatably and coaxially mounted the sun gear 5 and the planet carrier 6. A control member or rod 10 is movably mounted inside the hollow input shaft portion 9 for axial displacement relative thereto.

A fluid coupling is arranged within casing 1. This fluid coupling includes an impeller member 41 fixed to or integral with the input shaft portion 2 and a turbine member 42 fixed to the sun gear 5 or integral therewith for bodily rotation. The fluid coupling is provided with a housing 55 rotatably mounted inside the transmission casing 1 and welded at 56 to the impeller member 41 for rotation with the latter. The axially movable control or actuating rod 10 is provided with a camming portion of enlargement 21 associated with a single set of locking balls 11 mounted in bores through the hollow input shaft portion 9 and in registry with a set of cavities 20 made in planet carrier 6. The control rod 10 is slidably mounted like a piston by a block 57 slidable into the hollow end of the output shaft portion 3 and by its other end engaging into a counterbore 58 in the hollow input shaft portion 9. A pin 59 is fixed to the control rod 10 and extends transversely therefrom into guide slots 60 extending longitudinally through the peripheral wall of the hollow end of the output shaft portion 3.

The planet carrier 6 is provided with a braking flange 49 which is operatively associated with a braking unit 51, including a pair of mutually pivoted jaws 61.

A pivot 62 extends through the outside wall of the transmission casing 1 and a cam 63 is fixed on the inner end of the pivot 62 for rotation therewith. As can be seen in FIG. 2, the cam 63 is profiled and arranged to cam the jaws 61 into braking engagement with the braking flange 49 against the bias of a spring, not shown. A handle 64 is pivoted at 64' to a bracket 62' fixed on the exterior end of the pivot 62 to allow actuation of the cam 63 and the braking unit 51. Handle 64 can be lifted against action of a spring 72 to clear a rest bracket 73 secured to casing 1. Bracket 73 has handle receiving notches to hold the handle in brake releasing or brake applying position.

A lever 65 is fixed to the interior end of the pivot 62 to be rotated by the latter in correlation with the actuation of the cam 63. A swivelling fork 66 is fixed to the lever 65 to form a swivelling connection between the latter and a rod 67. The latter is pivoted at its opposite ends to the fork 66 and to a lever 68. The latter pivots at one end onto a bracket 69 and slidably engages at its other end a sliding ring 70 to which the ends of the transverse pin 59 are secured; ring 70 allows relative rotation between the transverse pin 59 and the output shaft portion 3 and the linkages 67 and 68.

A braking flange 71 is provided on the output shaft portion 3 and a manual braking unit 38 is provided to brake the output shaft portion 3.

Upon rotation of the input shaft portion 2, the fluid coupling transmits rotation to the sun gear 5. When the control rod 10 is in the reverse position illustrated in FIG. 1, brake 51 is applied, stopping planet carrier 6. The rotation of the sun gear 5 is transmitted to the planet gears 7 which rotate output shaft 3 in reverse, as compared to the direction of rotation of the input shaft portion 2.

For forward drive, handle 64 is moved to a position wherein brake 51 is released and control rod 10 is shifted to the left (FIG. 1), causing direct clutching of planet carrier 6 with input shaft 2 by engagement of locking balls 11 into cavities 20. With output shaft 3 stationary, vehicle at rest, planet gears 7 react against stationary ring gear 8 and rotate sun gear 5 and turbine member 42 in the same direction and with turbine member 42 rotating faster than impeller member 41. As the speed of input shaft 2 is increased, there is gradual fluid coupling of members 41 and 42, whereby the speed of rotation ratio of sun gear 5 to satellite carrier 6 gradually decreases to substantially a 1:1 ratio. There results a substantially direct drive between input shaft 2 and output shaft 3: the planetary system is not working because two of its members are locked together, namely sun gear 5 and planet carrier 6. Thus, at maximum transmission ratio, there is practically no friction and no wear produced in the planetary system.

In forward as well as in reverse drive conditions, continuously variable transmission ratio is obtained by the gradual fluid coupling of input shaft 2 with sun gear 5 with increasing speed of input shaft 2.

What I claim is:

1. A variable ratio transmission with reverse drive comprising an input shaft means, an output shaft means, a planetary gear set including a ring gear secured to said output shaft means, a sun gear, a freely rotatable planet carrier and planet gears freely rotatable on said planet carrier and intermeshing with said sun gear and said ring gear, means to releasably brake said planet carrier against rotation, means to releasably lock said planet carrier to said input shaft means, control means to effect release of said locking means and braking of said braking means, and vice versa, and a fluid coupling including an impeller member secured to said input shaft means and a turbine member secured to said sun gear, whereby acceleration of said input shaft means causes progressive coupling of said sun gear to said input shaft means, said input and output shaft means being coaxially mounted, together with said impeller and turbine members of said fluid coupling, said input and output shaft means having communicating adjacent hollow portions and said locking means include a rod located within and axially movable relative to said input and output shaft means hollow portions, a cross pin secured to said rod and extending through elongated slots made in the hollow portion of said output shaft means, a sliding ring surrounding said output shaft means and connected to said cross pin, and locking members rotatably carried by said input shaft portion and radially movable into locking arrangement with said planet carrier upon axial movement of said rod in one axial direction.

2. A transmission as claimed in claim 1, further including manually-operable control means to axially displace said sliding ring and, simultaneously, actuate said planet carrier braking means.

* * * * *